No. 815,870. PATENTED MAR. 20, 1906.
V. SIMECEK.
AUTOMATIC AIR BRAKE COUPLING.
APPLICATION FILED JUNE 14, 1905.
3 SHEETS—SHEET 2.
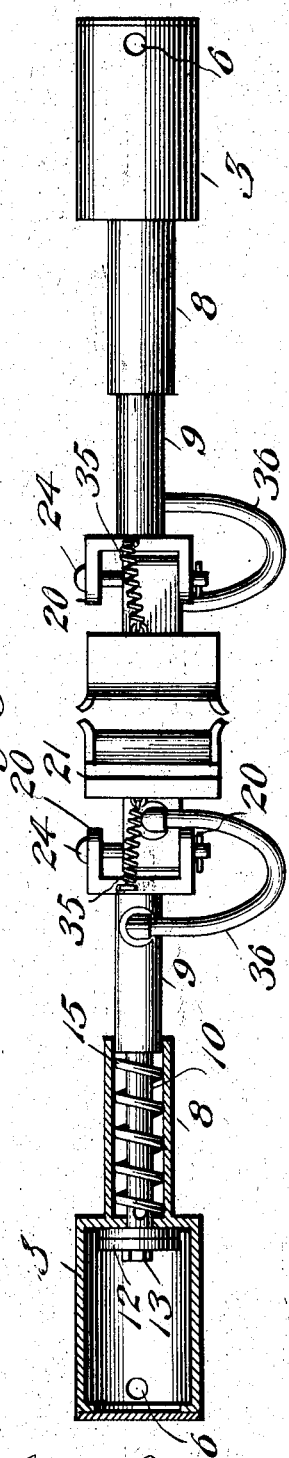
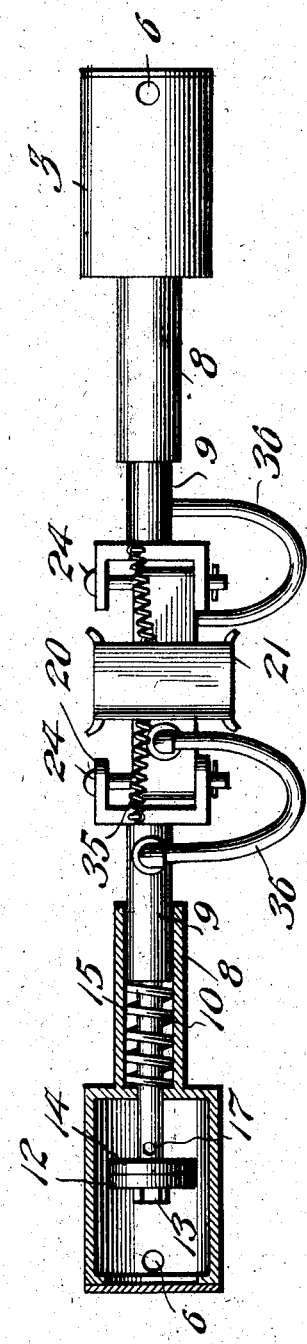
Witnesses
Geo Ackman Jr.
D. W. Gould
Inventor
Vaclav Simecek,
By Victor J. Evans
Attorney

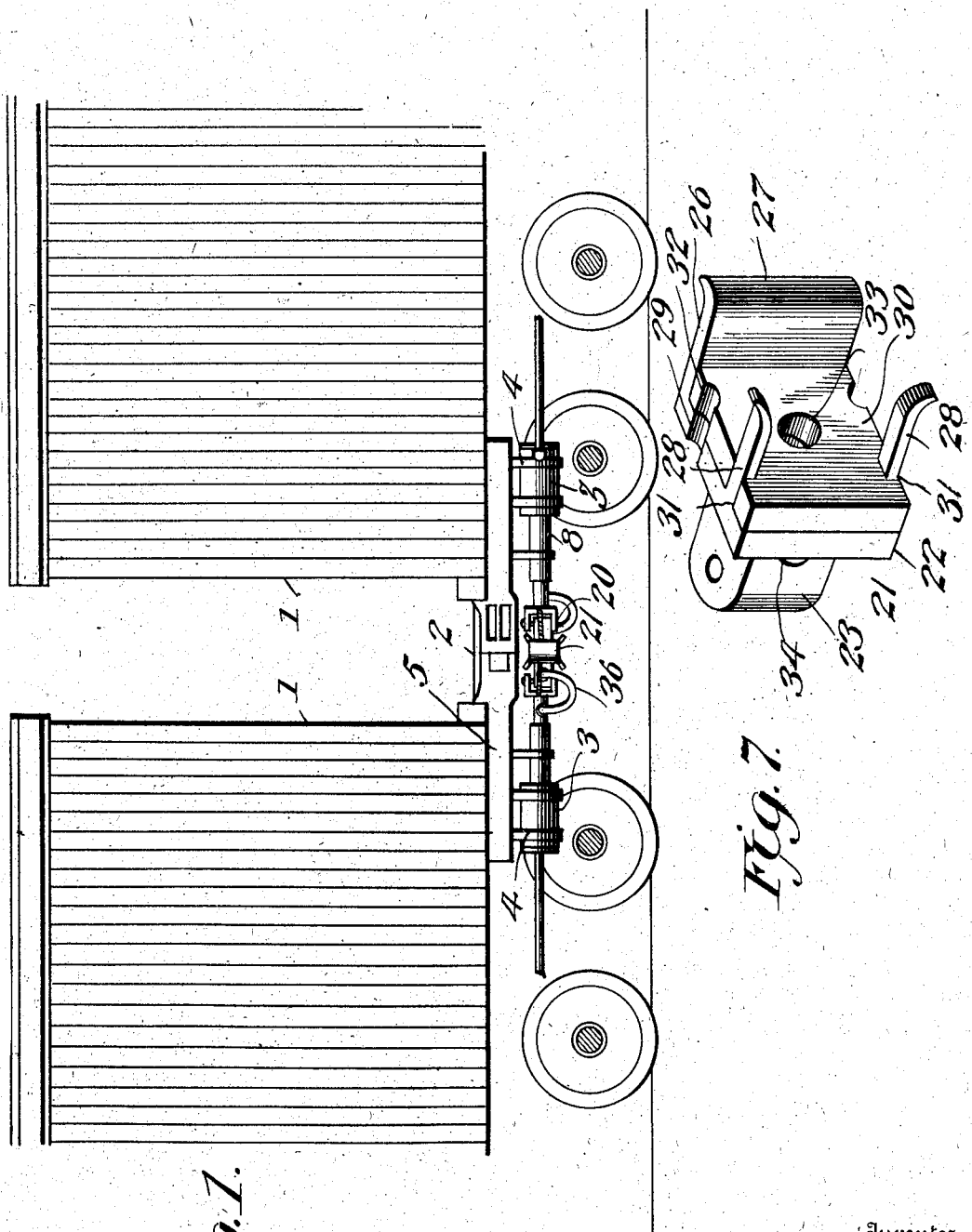

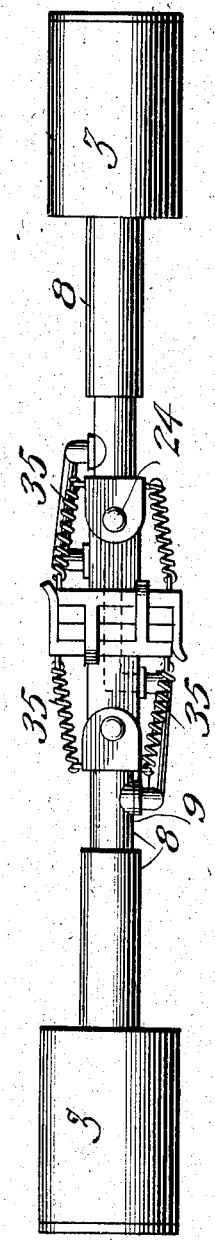
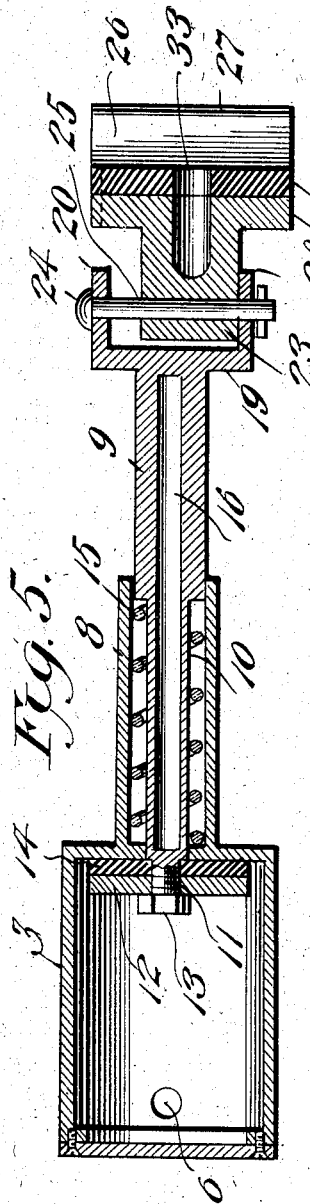
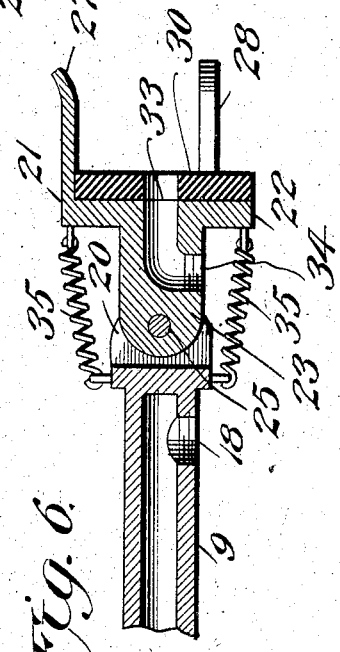

UNITED STATES PATENT OFFICE.

VACLAV SIMECEK, OF FLATONIA, TEXAS.

AUTOMATIC AIR-BRAKE COUPLING.

No. 815,870.     Specification of Letters Patent.     Patented March 20, 1906.

Application filed June 14, 1905. Serial No. 265,293.

*To all whom it may concern:*

Be it known that I, VACLAV SIMECEK, a citizen of the United States, residing at Flatonia, in the county of Fayette and State of Texas, have invented new and useful Improvements in Automatic Air-Brake Couplers, of which the following is a specification.

The invention relates generally to improvements in coupling devices for connecting the air-brake hose of railway-cars, and particularly to a coupling adapted for automatic connection with its fellow coupling in the automatic coupling of the cars.

The main object of the present invention is the production of couplings of this character so that when they are brought together in the coupling of the cars they will become automatically and firmly connected to provide for uninterrupted communication of the air-pressure between adjoining cars, the mounting of the couplings being such as to adapt them for the vertical or lateral movement incidental to the movement of the cars without danger of disconnection.

The preferred embodiment of the detail construction of my invention will be described in the following specification, with particular reference to the accompanying drawings, in three sheets, in which—

Figure 1 is a partial elevation of two connected cars, illustrating the application thereto of my improved couplings. Fig. 2 is an enlarged side elevation illustrating my improved couplings just prior to their automatic connection. Fig. 3 is a similar view showing the couplings in connected relation. Fig. 4 is a top plan of the couplings in connected relation. Fig. 5 is an enlarged vertical section through one of the couplings. Fig. 6 is an enlarged horizontal section through one of the couplings, partially broken off. Fig. 7 is an enlarged perspective of the coupling-head.

Referring to the drawings, 1 represents two cars connected to the usual or preferred car-couplings 2, it being understood that so far as the detail of my invention is concerned the car-couplings may be of any preferred or standard construction desired. The coupling forming the subject-matter of the present invention is secured on the end of each car, and as these couplings are duplicates in structure and operation a detail description of one will suffice for all. The coupling comprises a cylinder 3, supported in hangers 4, depending from the car-coupling draw-bar 5 and in open communication with the usual train-pipe or service-cylinder to a port or opening 6. The forward end of the cylinder 3 is formed with a central opening 7 and with a concentric barrel extension 8.

9 represents what I term a "piston-stem" arranged for longitudinal movement in the barrel or sleeve 8, the forward end of the stem being of a size to snugly fit within said sleeve, while the rear end is reduced, as at 10, and of a size to fit within the opening 7 in the head of the cylinder 4. The rear end of the stem is provided with a threaded extension 11 to receive a metallic disk 12, a nut 13 serving to secure the latter in place on the extension 11. A rubber or other packing disk 14 is mounted on the extension 11 forward of the disk 12 and is adapted in the normal position of the stem to completely seal the opening 7 in the cylinder-head. A spiral spring 15 encircles the reduced portion 10 of the stem within the sleeve 8, one end of the spring bearing against the cylinder-head, while the other end bears against the shoulder formed by the reduced portion 10 of the stem. The tension and force of the spring are directed to normally maintaining the stem at its forward limit of movement, in which position the packing-disk 14 is seated against the opening 7 in the cylinder-head, as shown in Fig. 5.

The stem 9 is hollow for the greater portion of its length, being formed with a longitudinal channel 16 for the passage of air therethrough, as hereinafter described. Laterally-arranged ports 17 and 18 are formed at the respective ends of the stem, the former being located immediately contiguous the packing-disk 14, while the latter is positioned near the opposite end of the same. Each of these ports is in direct communication with the channel 16 of the stem and are so arranged that when the stem is in its forward or normal position the port 17 is within the sleeve 8, and when the stem has been moved rearward to its operative position, as hereinafter described, the port 17 is within the cylinder 3 to establish communication between the air-channel 16 of the stem and the interior of said cylinder. The forward end of the stem is provided with a transverse plate 19, projecting above and below the surface of the stem and being provided at the upper and lower ends with forwardly-projecting flanges or lips 20.

21 represents the coupling-head, comprising a base-plate 22, centrally provided with a rearwardly-projecting lug 23. The head is adapted for pivotal connection with the stem through the medium of a pivot-bolt 24, passing through the lips 20 at the forward end of the stem and through an opening 25, formed in the lug 23. At one side edge terminal the base-plate 22 of the coupling-head is provided with a forwardly-projecting flange or guide-plate 26, flared or outwardly turned at its forward or free end, as at 27, to facilitate connection of the contiguous coupling-heads, it being understood that the fellow coupling is provided with a similar guide-plate, but on the reverse or opposite edge of the base-plate. The upper and lower edges of the base-plate are provided with forwardly-projecting fingers 28, flared or outwardly bent at their free ends to facilitate engagement with the fellow coupling. Intermediate the fingers 28 and the guide-plate 26 the upper and lower edges of the base-plate are formed with recesses or notches 29 of a size and shape to receive the fingers 28 of the fellow coupling, it being understood that the fellow coupling is also provided with the notches 29 and fingers 28, but located reversely to the coupling-head described, so that when the heads are in coupled relation the fingers of one will engage the notches of the other and the guide-plate of one will engage the free edge of the base-plate of the other. A rubber gasket 30 is supported in contact with the base-plate of the head on the front side of the latter. The gasket is coextensive in dimension with the head and is held in place by the fingers 28 engaging notches 31 formed in the edges of the gasket. The gasket is also formed with notches 32 to aline with the notches 29 in the base-plate. An air-channel 33 is formed in the head 21, terminating at one end in the side of the lug 23, as at 34, the opposite end extending centrally through the base-plate and through the rubber gasket to register with a similar channel of the fellow coupling-head, whereby to provide a direct air-channel when the coupling-heads are in connected relation. The lug 23 is of less vertical dimension than the distance between the lip 20 at the forward end of the stem, whereby the coupling-head is adapted for independent vertical movement under the influence of the connected cars without exerting strain upon the stem. Owing to the vertical pivotal connection of the heads they are adapted for independent lateral movement, as may be required in the irregular movement of the connected cars. Retaining-springs 35 are arranged on each side the head, being terminally connected to the plate 19 at the forward end of the stem and to the base-plate 22 of the head, whereby to normally maintain the head in alinement with the stems and return the head to this position after lateral movements under the influence of the connected cars. The springs tend to avoid any torsional strain on the head and effectively take up any motion thereof which would result in a disconnection of the coupled heads. A flexible connection, such as a rubber hose or pipe 36, is terminally connected with the port 18 in the stem and the opening 34 in the lug 23, whereby to establish communication between the channels 16 in the stem and the channel 33 in the head, the pipe being of such length as to permit the necessary movement of the head when coupled without destroying the communication. The strength and arrangement of the spring 15 are such as to normally maintain the coupling-head at the extreme forward position, so that the packing-disk 14 bears snugly against the head of the cylinder. In this position of the parts the coupling-head projects forward some distance beyond the car-coupler 2 of the particular car.

In operation, a coupler being secured on each car and the car moving toward each other for coupling in the usual manner, the respective heads 21 of the opposing hose-couplers come into engagement to connect the air-brake line throughout the length of the frame. The respective heads are guided through the medium of the opposingly-situated guide-plates 26 to position the gaskets 30 of each head in contact, as illustrated particularly in Fig. 4. In this movement the fingers 28 of one head will seat in the recesses 29 of the opposing head. As the coupling-heads project beyond the car-couplers, said heads will contact or engage prior to the coupling of the cars, and as said cars continue their movement toward each other for tractive coupling the springs 15 will be compressed, moving the stems 16 inward to permit the ports 17 at the rear of said stems to communicate with said cylinders, whereby to establish communication throughout the service-line of the train, as clearly illustrated in Fig. 3. The rearward movement of the coupling-heads compressing the springs 15 maintains said heads under the tension of the springs while in coupled relation to prevent any accidental separation thereof. The heads are further held in connected relation by the guide-plates 26 and the fingers 28 of the respective heads, as said elements tend to hold the heads connected against the independent movement, as will be obvious. The pressure of the springs 15 is exerted against the heads, tending to a compression of the gaskets 30 of the heads between the respective base-plates 22, maintaining an air-tight junction between the heads.

By the mounting or connection of the respective heads with the stems, as above described, the connected heads are enabled to accommodate themselves to vertical or lateral movement necessarily incident to the movement of the cars without liability of disconnection.

Having now described my invention, what I claim as new, and desire to secure by Letters Patent, is—

1. A hose-coupling comprising a cylinder, a stem horizontally movable in the cylinder, and a coupling-head supported at the outer end of the stem and adapted for independent and lateral movement with relation thereto, said head having guide-flanges arranged in reverse relative order to and adapted to coöperate with flanges on the fellow coupling-head.

2. A hose-coupling comprising a cylinder in open communication with the train-line, a stem movably connected with the cylinder, said stem being formed with an air-channel normally out of communication with the cylinder, a coupling-head supported by the stem and adapted for independent and lateral movement with relation thereto, said head when connected with its fellow coupling operating to move the stem inward to establish communication with the cylinder.

3. A hose-coupling comprising a cylinder in communication with the train-line, a stem movably connected with the cylinder, and formed with a longitudinal air-channel, said channel being normally out of communication with said cylinder, a coupling-head provided with guiding members for coöperation with the fellow head, said head being carried at the outer end of the stem and connected for independent and lateral movement with relation thereto and a gasket carried by the head and supported by said guiding members.

4. A hose-coupling comprising a cylinder in communication with the train-line, a stem movably connected with the cylinder, a head carried by the stems and adapted for independent and lateral movement, a guide-plate projecting forwardly from one side edge of the head, guiding-fingers projecting forwardly from the upper and lower edges of the head, said upper and lower edges being formed with recesses, and a gasket secured to the head and engaging said guide-fingers.

In testimony whereof I affix my signature in presence of two witnesses.

VACLAV SIMECEK.

Witnesses:
J. J. SHILLER,
W. E. RABB.